United States Patent [19]

Hickey

[11] Patent Number: 5,354,952
[45] Date of Patent: Oct. 11, 1994

[54] CONDUIT SUPPORT BRACKET

[76] Inventor: Gary S. Hickey, 391 Butter St., Germantown, Ohio 45327

[21] Appl. No.: 996,443

[22] Filed: Dec. 24, 1992

Related U.S. Application Data

[63] Continuation-in-part of Ser. No. 807,447, Dec. 13, 1991, abandoned.

[51] Int. Cl.⁵ .............................................. H02G 3/04
[52] U.S. Cl. ..................................... 174/48; 248/68.1
[58] Field of Search ...................... 248/58, 61, 62, 63, 248/65, 68.1, 73, 74.1, 49; 174/48

[56] References Cited

U.S. PATENT DOCUMENTS

| 3,464,660 | 9/1969 | Neale, Sr. | 248/61 |
| 5,067,677 | 11/1991 | Miceli | 248/68.1 |

Primary Examiner—Ramon O. Ramirez
Attorney, Agent, or Firm—Donald P. Gillette

[57] ABSTRACT

An electric wiring system comprising a plurality of electrical members including at least one wire and one enclosure to make a connection between the wire and one of the members, and a conduit support bracket. The enclosure having walls perpendicular to each other with one wall having at least one entrance for the wire. The conduit support bracket having a plate member attached at one end to one of the walls of the enclosure while supporting conduits adjacent its second end.

26 Claims, 3 Drawing Sheets

FIG. 11
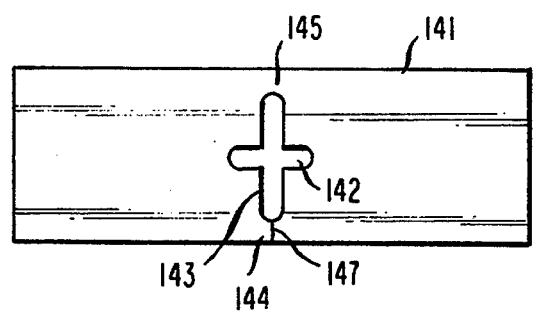
FIG. 12
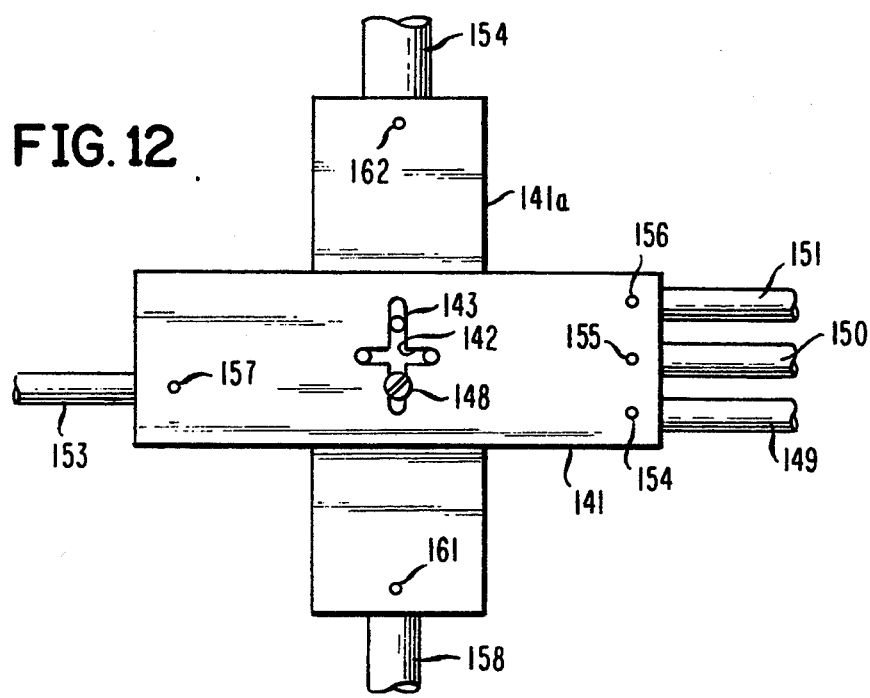
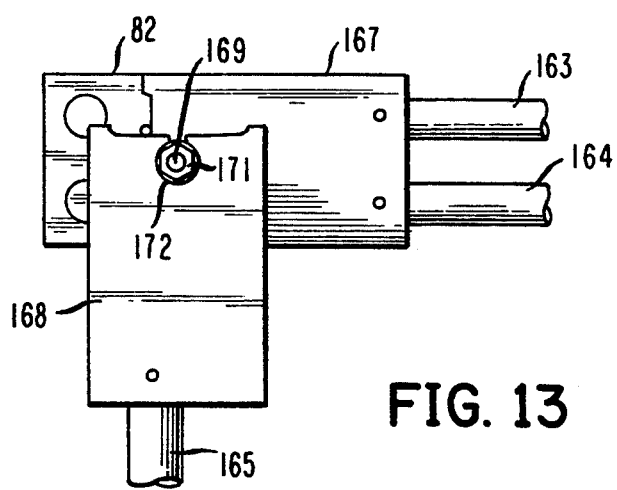
FIG. 13

1

CONDUIT SUPPORT BRACKET

This is a continuation-in-part of my corresponding application Ser. No. 807,447, filed Dec. 13, 1991, now abandoned.

BACKGROUND OF THE INVENTION

1. Field of the Invention

This invention relates to the field of wiring systems for the distribution of electricity, particularly in office buildings, hospitals, and other types of public or commercial buildings. More specifically, it relates to simplified means for supporting wiring conduits in accordance with industry standards set forth in the National Electrical Code promulgated by the National Fire Protection Association in order to reduce the hazards associated with fires produced by faulty electrical distribution systems.

2. The Prior Art

Safety regulations require that wires carrying electrical current for operating lighting devices, motors, and other apparatus in buildings be strung safely and securely from each connection point to the next. The regulations require that connection points be within protective enclosures, such as outlet boxes, junction boxes, cabinets, and the like. In commercial buildings, in particular, the wires that extend from one enclosure to the next are routed within a hollow conduit for protection. Each end of each conduit is securely mechanically connected to one of the protective enclosures, unless the distance between two enclosures is so great that two or more conduits must be joined end-to-end to be long enough. Conduit couplings are required in runs longer than 10', consistent with the fact that conduit is typically made in 10' lengths. The wires within such long runs extend through the conduit fittings without interruption.

Conduits are typically rigid tubes having annular cross sections with prescribed cross-sectional dimensions and wall thicknesses, and they may be made of a suitable metallic or non-metallic material, provided such material meets requirements of structural and chemical integrity and is sufficiently resistant to moisture, fire, and corrosive chemical atmospheres.

Whatever the cross-sectional dimensions of a conduit, and whether it be metal or a non-metallic material, the Code states that the conduit must be securely fastened in place. This not only requires that each conduit be securely mechanically fastened to each enclosure at the point of entry, but it also requires that a long run of conduit that spans an open space be supported at least once every so many feet, depending on the type of conduit. For various types of metal conduit, there must be a support at least every 10 feet, with certain exceptions. For non-metallic conduit, the maximum permissible number of feet between supports varies according to the diameter of the conduit; conduit having a diameter in the range from ½" to 1" must be supported at least every 3', while conduit having a diameter of 6" need only be supported every 8'.

Of particular importance with respect to this invention is the requirement that each rigid conduit, whatever its diameter and whatever the material of which it is made, must be securely fastened within 3' of each enclosure or other conduit termination.

It is currently the practice, and has been for a long time, to fabricate support structures at a job site to meet all of the regulations for secure support structures. Moreover, the requirement to support conduit within 3' of each enclosure is often met by constructing, out of conveniently available material, a structure much shorter than 3'. Such ad hoc support structures are frequently quite complex, necessitating much cutting and assembly at the installation site, and, as a result, are costly, not only in terms of the amount of material used, but frequently even more so in terms of the amount of labor required to form the parts and to assemble them into a unitary structure and then connect them to the electrical components. Some ad hoc support structures are relatively simple to cut and assemble and may take only a short time to produce, but the number of such structures required in a typical commercial building is so great that the total time devoted to their construction and installation is very likely to be a substantial, though often unrecognized, expense.

OBJECTS AND SUMMARY OF THE INVENTION

It is an object of this invention to provide a simple, improved support bracket that can be used in conjunction with a wide variety of enclosures to meet the Code requirement for a support within 3' of each enclosure.

Another object is to provide a support bracket that can support different intersections of conduits at an enclosure.

Still another object is to provide a support bracket that can take advantage of the standardized locations for conduit intersections on an enclosure so that a single bracket can accommodate conduit-holding means placed in alignment with conduits terminating at any of the standardized locations on any side of an enclosure.

Yet another object is to provide a support bracket such that more than one of them can be attached to a single enclosure to extend out beyond each of the sides of the enclosure without interfering with each other.

A further object is to provide a support bracket that can easily be separated into parts on the job to accommodate different arrangements of conduits extending from one, two, three, or all four sides of an enclosure.

A further object is to provide a support bracket that can be used to provide support of a conduit from above or below.

A still further object is to provide a unitary support structure to which a wide variety of conduit-holding means can be attached to hold one or more conduits in place, according to the Code.

Those skilled in the art of installation of electrical wiring networks will recognize still other advantages and objects of this invention after reading the following description in conjunction with the drawings.

The bracket of this invention is to be used in conjunction with an enclosure that has a first wall and at least a second wall perpendicular to the first wall. For convenience, the first wall may be referred to as the base and the second wall, and any other walls perpendicular to the base, as a side wall. Typically, there are four side walls, not necessarily all of the same size. At least one of the side walls, as well as the base, has one or more locations, typically defined by knockouts, at which one or more wires enter the enclosure. It is also typical for the base to have an array of small holes at specific locations to receive bolts or threaded rods to be used in mounting the enclosure. At each such location the conduit enclosing the wire or wires entering there is required to terminate and to be mechanically attached to the side wall to extend generally perpendicularly therefrom and generally parallel to the base for at least a short distance away from the enclosure.

The bracket of this invention comprises a rigid plate, or plate-like member, with aperture means, which can be one or more holes or slots or notches, through which to pass attachment means to affix the bracket substantially parallel to the base of the enclosure. The aperture means can be near one end of the plate or in the central region of the plate, and the means attaching it to the enclosure can be a screw or a threaded rod. If the aperture means is near a first end of the plate, the plate must be long enough so that its second end extends beyond an edge of the base. Preferably, the second end is wide enough to extend over any of the locations at which a conduit could be attached to a side wall. Having the second end of the plate that wide allows conduit-holding means to be located at any position within a range of locations corresponding to any opening at which a conduit can terminate at the second wall of the enclosure. The conduit-holding means can be installed by drilling or forcing holes at appropriate transverse locations adjacent the second end.

Alternatively, the outwardly extending end of the bracket may include transverse slot means to receive a conduit-holding device in line with the conduit to be held thereby, wherever the conduit extends from the enclosure. The transverse slot means can also be provided with edge flanges to engage hooks on certain kinds of standard clamps that have advantages in certain conduit layouts. As a further alternative, the slot means can be a separate channel, or strut, member attached to the plate and having such flanges.

The width of the first end of the plate adjacent the aperture can be cut so that it tapers to a narrow width, if not to a point. Up to four such plates can be attached to one enclosure and can all lie in the same plane and extend outwardly in four perpendicular directions if the angle at which the first end of each of the plates is tapered causes the approaching edges of the tapered end to approach each other at 90° or less.

In an alternative embodiment, the plate is rectangular and long enough to extend outwardly beyond opposite side walls of an enclosure. The slot means through which attachment means bass is in the center of the plate and may be in the form of intersecting slots, one extending transversely most of the way across the plate, and the other extending longitudinally along the center line of the plate, with the centers of both slots intersecting at the center of the plate. This not only allows a single plate to be used to support conduits extending from opposite sides of the enclosure, but the transverse slot weakens the plate enough so that it can easily be scored by diagonal cutters and broken in twos thereby forming two half-size plates, each approximately the same size as the plate with a tapered end. One of these half-size plates can be used if only one conduit support is needed, or two of them can be stacked, one on top of the other and extending perpendicularly from the central region of the enclosure to support conduits extending from side walls perpendicular to each other. Or one half-size plate and one full-size plate can be stacked to support conduits extending from three sides, or two full-size plates can be stacked to support conduits extending from all four sides.

The invention will be described in greater detail in connection with the drawings, in which identical serial numbers in different figures indicate the same item.

BRIEF DESCRIPTION OF THE DRAWINGS

FIG. 11 is a modified embodiment of a double-ended support bracket in accordance with this invention.

FIG. 12 is a plan view of two double-ended support brackets of FIG. 11 attached to a junction box and supporting conduits extending outwardly from the junction box.

FIG. 13 is a plan view of half of each of two of the support brackets in FIG. 11 attached to a junction box.

DETAILED DESCRIPTION OF A PREFERRED EMBODIMENT

Figure 1:
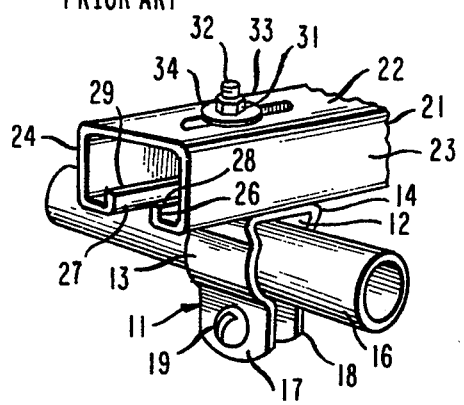
FIG. 1 is a perspective view of one type of well-known device for holding conduit in fixed relation to another structure.

FIG. 1 shows a type of clamping device 11 commonly referred to by electrical installers in the building trade as a minnie, or Minerallac ®, which is made by the Minerallac Company. The term minnie will be used in the following description. The example shown is a generally U-shaped device formed of sheet metal and provided with a flat base 12 and two arms 13 and 14. Both of the arms have a cylindrically rounded part shaped to fit against a cylindrical component, such as a piece of conduit 16. The outer ends 17 and 18 of the arms are relatively parallel to each other and have aligned holes to permit a bolt 19 to pass therethrough. The dimensions of a minnie are such that there is some space between the ends 17 and 18 when the bolt 19 is tightened to cause the arms 13 and 14 to clamp the conduit 16 tightly.

Minnies can be supported in innumerable ways. In FIG. 1, the minnie 11 is supported from a strut 21 that has a generally U-shaped cross section formed by a flat central part 22 and two side walls 23 and 24 extending parallel to each other from the part 22. Both of the side walls have inwardly turned flanges 26 and 27, respectively, with edges 28 and 29 that extend toward the central part 22. These flanges play no part in the structure illustrated in FIG. 1 but will be found to be important in other structures. The central part 22 has a plurality of apertures, such as the somewhat elongated aperture 31, spaced along it to allow other components to be bolted to the strut. In this instance, the minnie 11 is attached to the strut 21 by a bolt 32 that passes up through a central hole in the central part 22 and through the aperture and is held in place by a nut 33 to form a complete conduit-holding device, which may also include a washer 34 on the bolt to prevent the nut from being drawn through the relatively large aperture.

Figure 2:
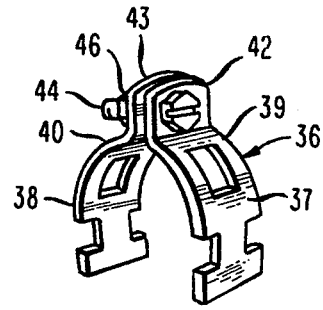
FIG. 2 is an a perspective view of another well-known type of conduit-holding device.

Another well-known type of conduit-holding means is shown in FIG. 2 and is referred to as a strut strap 36. It has two mirror-image side members 37 and 38. The upper parts 39 and 40 of the side members are curved, but not necessarily along the same radius as that of a conduit with which the strut strap is intended to cooperate. The uppermost ends 42 and 43 are flanges bent away from the curved parts to be more or less parallel to each other when the strut strap 36 is in use, holding a conduit in place, and both of the ends have a hole for a bolt 44 to pass through. The ends are drawn together by tightening a nut 46 on the bolt to force the upper parts 39 and 40 firmly against a cylindrical object, such as a conduit.

Figure 3:
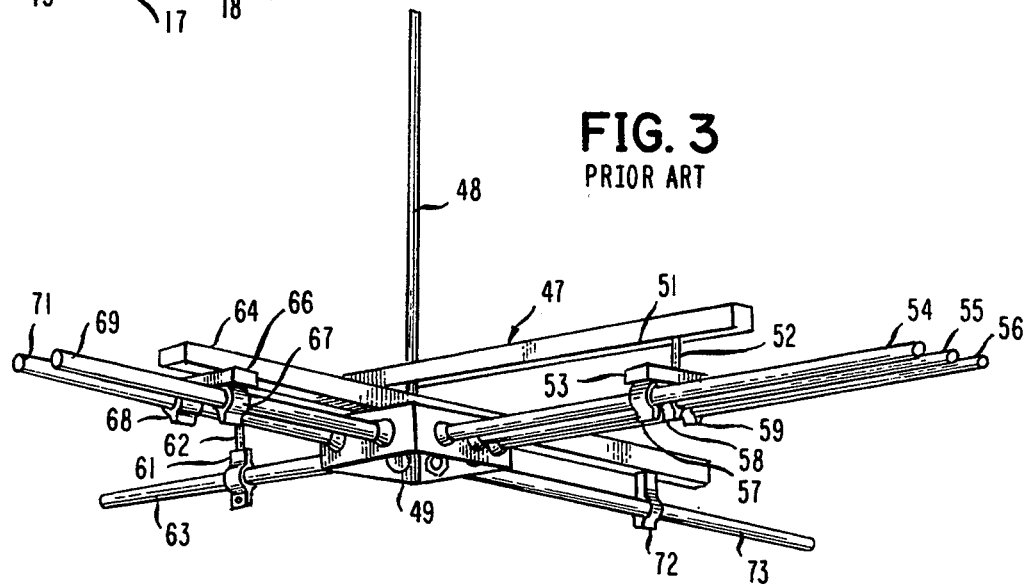
FIG. 3 is a perspective view looking up at a conduit support structure typical of those currently made on the job.

FIG. 3 shows a conduit support structure 47 suspended from an overhead structure, such as a ceiling (not shown) by a threaded rod 48, frequently referred to as an all-thread. The structure 47 is made up on the job by cutting and assembling pieces of threaded rods and struts and conduit-holding means, and each conduit support structure is made to support the conduits at a given enclosure, here illustrated by a junction box 49. It is possible that no two conduit support structures in a building will be exactly the same, since the conduits intersecting at a given enclosure depend on the electrical apparatus associated with that enclosure. For example, the support structure 47 is particularly complex because it supports conduits extending in all four directions from the junction box 49. Frequently, conduits extend in only one or two or three directions.

In FIG. 3, a strut 51 that is not over 6' long and is normally a good bit shorter is secured to the threaded rod 48 to extend horizontally above the junction box 49. Near one end of the strut 51 is a threaded member 52, which may be a long bolt or short piece of threaded rod, that supports a short strut 53 several inches below the strut 51. The strut 53 is horizontal and extends in a direction perpendicular to that of the strut 51 and is intended to support three parallel conduits 54–56 that are attached to one side of the junction box 49 and are parallel to the strut 51. The three conduits are attached to the strut 53 by three minnies 57–59, respectively, in the same way the minnie 11 in FIG. 1 is attached to the strut 21. Since the strut 51 is not over 6' long and is suspended at its center, the strut 53 cannot be more than 3' from the junction box 49, and thus meets the Code requirement.

At the other end of the strut 51 is a single minnie 61 suspended from the strut 51 by a bolt or threaded rod 62. Only a single minnie is needed at that point because only a single conduit 63 extends from that side of the junction box 49 and needs to be supported. However, if the conduit 63 did not intersect the box 49 at a knockout location directly under the strut 51, either a short strut similar to the strut 53 could be required or else the conduit 63 might have to be given an offsetting bend between the location of the minnie 61 and the point of attachment of the conduit 63 and the box 49 to align the end of the conduit with the knock-out location. Such bends are frequently required and are a further time-consuming activity for those installing the electrical system.

Below the strut 51 is another horizontal strut 64 that extends perpendicular to the strut 51, and, like it, is centrally supported and is not more than 6' long. The strut 64 may be directly against the upwardly facing surface of the junction box 49. A short strut 66 is attached near one end of the strut 64, and two minnies 67 and 68 are attached to it to support two conduits 69 and 71. At least, when a short strut 66 is required, offset bends are less likely to be necessary. Near the other end of the strut 64 is a minnie 72 that supports a single conduit 73.

It will be recognized that it would take a considerable amount of time to cut all of the struts and threaded rods and to make any offsetting S bends that might be needed for the structure and to assemble those parts into the complex support structure shown.

Figure 4:
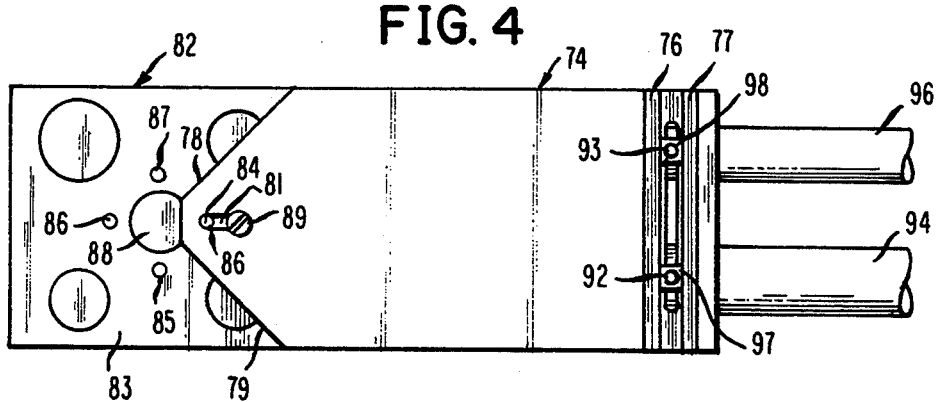
FIG. 4 is a plan view of a standard junction box with conduits extending from it and with one embodiment of a support bracket according to this invention.

FIG. 4 shows a simple conduit support bracket 74 according to this invention. This support bracket is a generally plate-like member that may be formed of sheet metal, as in this embodiment, or it may be molded of a suitable non-metallic substance that meets the Code requirements. The bracket 74 is flat except for two ridges 76 and 77 near one end and may be of any length within the maximum permissible value of 3'. Preferably, it is much shorter than that, and I have found a length of about 8" to be quite satisfactory.

The other end of the support bracket 74 is tapered almost to a point. The angle between the converging edges 78 and 79 is not more than 90° so that up to four such support brackets can intersect on one junction box 82 or other enclosure without overlapping each other. The support bracket 74 has a short slot 81 that serves as aperture means located along the center line of the bracket near the tapered end and long enough so that it overlaps at least one of the holes provided in the main wall, or base, 83 of the junction box 82. Different enclosures have different arrangements of bolt holes, but the junction box enclosure 82 is typical, having four holes 84–87 radially equidistant from a center knockout 88 and 90° apart. There is a fifth hole radially farther out beyond the hole 84, but it is covered by the head of a bolt 89 that extends through the slot 81 and through the fifth hole to attach the bracket 74 in surface-to-surface contact with the base 83. It will be noted that the length of the slot is great enough to allow the bolt 89 to pass through it and through either the fifth hole or the hole 84. The base 83 in this particular junction box is shown as having a four other knock-outs, not all of the same diameter, in addition to the central knock-out 88. The junction box 82 has four sides, but so-called octagonal boxes are well-known, as well as drum-shaped boxes having cylindrical sides. There is at least one knock-out on each side, and there is frequently more than one. Such knock-outs are easily removed, as the name implies, to allow a conduit to be attached to the box at that location. Other enclosures also have knock-outs similarly arranged.

Near the other end of the support bracket 74 is a slot 91 that extends transversely to the longitudinal dimension of the bracket and serves as receiving means to hold conduit-holding means, such as one or more minnies. The slot does not extend all the way across the bracket 74 but does extend far enough so that bolts 92 and 93 can pass through the slot in line with the axes of conduits 94 and 96 to allow minnies that support the conduits to be attached to the support 74 without requiring any offsetting bends. These minnies are held in place by nuts 97 and 98 that fit snugly between the ridges 76 and 77 that serve as engagement means extending along the slot 91 to prevent the nuts from turning when the minnies are being fitted onto the support bracket 74 and make it much easier to install the minnies on the bracket.

It will be noted that the conduits 94 and 96 are of different diameters. This is commonplace in electrical networks, and it is also common for junction boxes to have different numbers, sizes, and locations of knock-outs to accommodate the conduits being used. Junctions boxes are also made in different sizes and with differently shaped sides. The one shown in FIG. 4 is a square box 4" on each side, and it is convenient to make the main part of the support bracket 74 have the same width, although that is not mandatory.

Figure 5:
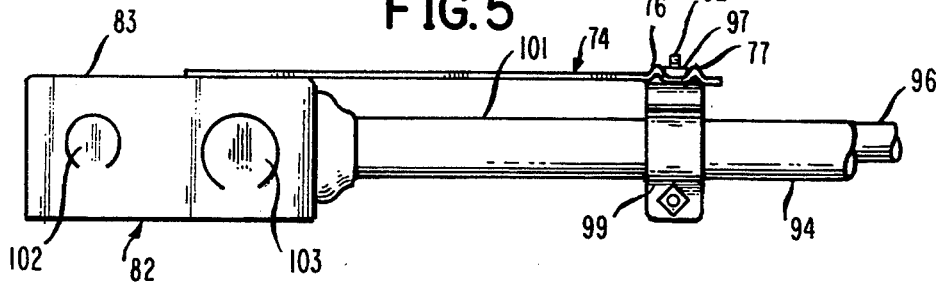
FIG. 5 is a side view of the apparatus in FIG. 4.

FIG. 5 shows the structure of FIG. 4 from the side. It is not by accident that a minnie 99 is attached directly to the under side of the support bracket 74 and that the rounded parts of the minnie fit the sides of the conduit 94 that extends perpendicularly from one of the sides of the junction box 82 and parallel to the bracket 74. Junction boxes are made so that the knock-outs provided on their sides place the nearest part of a conduit of any size at the same distance D from the plane of the base 83, as is clear from the relative locations of knockouts 101 and 102 of different size.

Figure 6:
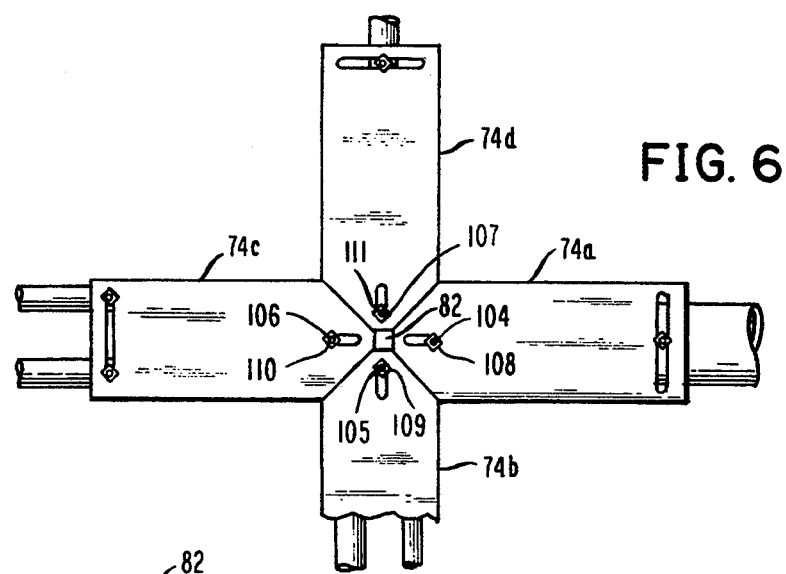
FIG. 6 is a plan view of four support brackets, all attached to a junction box and supporting conduits extending outwardly from the junction box.

FIG. 6 shows four support brackets 74a–74d attached to the junction box 82, only a small part of which is visible. Each one is attached by a bolt 104–107, respectively, held in place by a nut 108–111. These support brackets are entirely flat and do not have the ridges formed in the bracket 74 in FIG. 5. However, each of the supports 74a–74d does have a transverse slot that allows minnies to be placed at any point to be in line with a conduit attached to the junction box at any of the knock-outs provided in its sides. This makes it unnecessary to bend the conduit to align it with a knock-out location.

Figure 7:
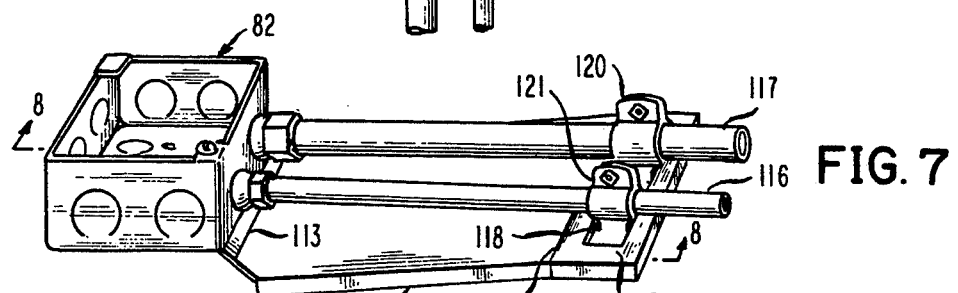
FIG. 7 is a perspective view of a modified form of conduit support bracket according to this invention.
Figure 8:
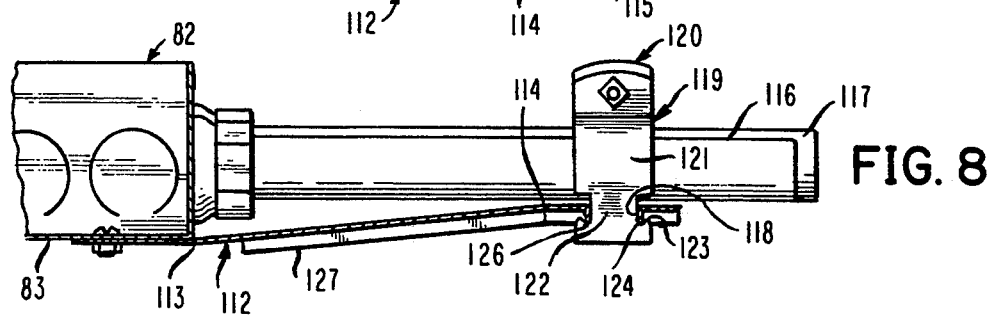
FIG. 8 is a cross-sectional side view of the apparatus in FIG. 7 taken along the line 8—8 in that figure.
Figure 9:
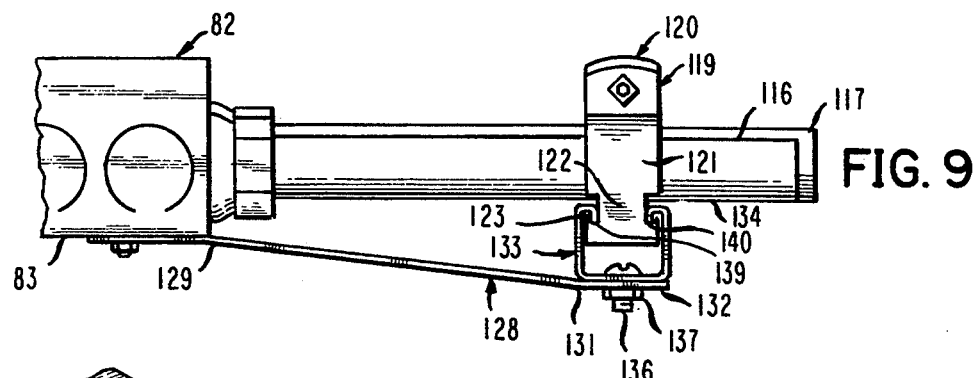
FIG. 9 is a side view of another embodiment of a conduit support bracket according to this invention.

FIGS. 7–9 show support brackets arranged to use strut straps like the strap 36 in FIG. 2 as conduit-holding means. These straps grip a cylindrical object, such as a conduit, but pressing it against a surface from which the strut strap extends. FIGS. 7 and 8 show a plate-like support bracket 112 bent at two places 113 and 114. The bend 113 tilts the bracket 112 only slightly, just enough to offset a platform area 115 at the outer end of the bracket 112 from the plane of the base 83 of the junction box 82 by an amount substantially equal to the distance from the base 83 to the adjacent part of the knock-out locations to which the conduits are attached. The bend 114 is in the opposite direction from the bend 113 and of an equal angular amount. These small angular displacements cause the conduits 116 and 117 extending from the box to be flush with the platform area, which causes the platform area to be parallel to the conduits 116 and 117 and allows the conduits to be drawn tightly against the platform area 115 to provide the required support without having to bend the conduits.

The bracket 112 is wider than the enclosure 82 to which it is attached. This is necessary because the transverse slot 118, which is closed at each of its ends, is formed as receiving means to hold strut strap conduit-holding means 119 and 120, both of which are like the strut strap 36 in FIG. 2, and such straps must be turned sideways to get them into a closed-end slot. In order for the slot to receive the strut straps so that they can be aligned with any knock-out on an enclosure, the slot 118 has to be longer than the slot 91 in FIG. 4.

FIG. 8 shows the way the strut straps, such as the strap 119, engage the support bracket 112. From the point of view in FIG. 8, the upper part 121 of the strut strap 119 can be said to resemble a silhouette of a head, the central part 122 a neck, and the lower part 123 shoulders that curve or slope upwardly to points at their outermost extent. The neck 122 is a little narrower than the slot 118, and the edges of the slot are bent down as flanges 124 and 126 that comprise engagement means extending along the slot 118 to engage the shoulders 123 to hold the strap 119 in place.

The support bracket 112 in FIGS. 7 and 8 has a flange 127 around much of its periphery, and this flange could extend the rest of the way around. However, that is unnecessary for the pointed part of the bracket lying in surface-to-surface contact with the junction box 82, since there is no need to strengthen that part of the bracket 112.

Figure 10:
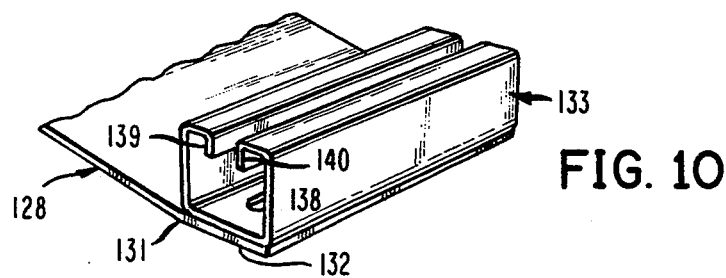
FIG. 10 is a fragmentary perspective view of one end of the conduit support bracket in FIG. 9.

FIGS. 9 and 10 show yet another embodiment of the invention. As in the embodiments in FIGS. 4–8, a support bracket 128 is shown in FIG. 9 as being attached to an enclosure, which is the same junction box 82 as in the earlier figures. It is to be understood that this is only one of the enclosures to which the bracket 128—or any of the other brackets 74 or 112—could be attached. The bracket 128 also has two slight bends 129 and 131, but they are in the opposite direction from the bends 113 and 114 in FIGS. 7 and 8. The bend 129 tilts the main part of the bracket 128 away from the extension of any plane that could pass through any part of the junction box 82 and be parallel to the plane of the base 83.

As a result of the directions and equal magnitudes of the bends 129 and 131, an outer platform 132 of the bracket 128 is parallel to the base 83 and is separated from it in the direction vertical to that surface by an amount just sufficient to allow a strut 133 attached to the surface of the platform 132 facing the conduits 116 and 117 to be directly in contact with the closest part 134 of the surfaces of the conduits. The strut 133 can be identical to the strut 21 in FIG. 1, and it is secured to the platform 132 by any convenient means, such as a bolt 136, which is shown held in place by a nut 137. The strut 133 illustrated has slots in it, one of which is identified by reference numeral 138, and the bolt (or bolts) 136 could pass through one or more of such slots.

One of the advantages of using a short length of strut 133 instead of forming a slot like the slot 118 in FIGS. 8 and 9 is that the strut straps can be slid into the strut through either end, and it is not necessary to twist them into engagement with inwardly directed flanges 139 and 140. As a result, the bracket 128, as shown in FIG. 10, need be no wider than the length of the strut 133 and, thus, no wider than the face of the enclosure 82 from which the conduits 116 and 117 extend.

While the tapered end defined by the converging edges 78 and 79 allow as many as four of the brackets 74 in FIG. 4 to be mounted neatly, flat against the base 83 of the enclosure 82, electricians installing them are frequently more interested in getting the job done than in making the neatest arrangement of the parts, as long as the resulting structure has the required integrity. In assembling four of the brackets 74 in the manner shown in FIG. 6 four separate bolts 104–107 are used. However, the assembly can be joined together by running a single bolt or all-thread through the slot 81 in each of the brackets. This means that only one of the brackets would then be able to lie in surface-to-surface and that the rest of them would be tilted slightly. The assembly, while less attractive, would still be strong enough to be accepted by inspectors, because the single bolt, or the two nuts used to grip the assembly on an all-thread can be tightened sufficiently to hold the assembly as rigidly as desired.

FIG. 11 shows another embodiment of a conduit-support bracket 141. Instead of having a tapered end, this plate-like member is rectangular and has aperture means in the form of crossed slots 142 and 143 at its center. The slot 142 extends longitudinally along the center line of the bracket 141, while the slot 143 is a transverse slot that extends most of the way across the bracket. While the dimensions are not to be considered as limiting the invention, it is convenient to make the bracket 141 12" long and 4" wide and to make the slot 142 2" long and ¼" wide and the slot 143 3" long and ¼" wide. This leaves bridges 144 and 145 of the original bracket material only ½" wide at the center of the plate.

The bridge 144 is shown as having a score, such as can be formed by standard diagonal cutters used by all electricians. When both of the bridges 144 and 145 are scored, the plate can be easily broken in two by bending the ends back and forth a time or two, thus dividing the plate into two brackets, each usable in the same way as the bracket 74 in FIGS. 4–6.

FIG. 12 shows two complete brackets 141 and 141a mounted in flat surface-to-surface contact with each other. The bracket 141a is between the bracket 141 and an enclosure, such as the junction box 82, only a small part of which is visible. A single joining device 148, such as a bolt or a threaded rod, passes through the shorter slot 142 of the bracket 141a and the longer slot 143 of the bracket 141.

The bracket 141 supports three conduits 149–151 extending from the right-hand end of the assembly and one conduit 153 extending from the left-hand end. Instead of providing the bracket 141 with slots in which to mount conduit-holding means, the minnies used that purpose are attached to regions near the outer ends of the plates by placing the minnies on self-tapping sheet metal screws 154–157 and forcing those screws through the plate from below, relative to the view in this figure. This is a convenient way of aligning the minnies with the conduits and makes the bracket 141 simpler to produce and less expensive than it would be if a transverse slot were formed adjacent its outer ends. The same arrangement can also be used in the bracket 74 in FIGS. 4–6.

The bracket 141a is shown in FIG. 12 as supporting two conduits 158 and 159 perpendicular to the conduits 149–151 and 153. The conduit-holding means that hold the conduits 158 and 159 are also attached to the outer ends of the bracket 141a by self-tapping screws 161 and 162, respectively.

FIG. 13 shows an assembly in which a junction box 82 has two conduits 163 and 164 extending from one side of it and a single conduit 166 extending from a perpendicular side. Such as assembly does not need a full bracket but only two halves, as shown. As described in connection with FIG. 11, a complete bracket 141 can be broken into two halves to form single-ended brackets 167 and 168 by scoring the narrow parts of the plate at the ends of the slot 143 and then bending the plate. This still leaves half of the shorter slot 142 intact, so that it can be used as aperture means in the same way as the slot 81 in the bracket 74 in FIGS. 4–6. Although the broken ends of the brackets 167 and 168 do not overlap fully, they are sufficiently overlapped to keep them neatly stacked on the enclosure 82. They are held together by a threaded member 169, such as a bolt or a threaded rod. A nut 171 is shown threaded onto the member 169 to squeeze the brackets and the enclosure 82 firmly together. A washer 172 is also used. While this may be necessary if the member 169 passes through one of the holes 84–87 in the enclosure 82 (FIG. 4), it may be desirable to pass the threaded member 169 through the center of the base 83. This would require that the knock-out 88 be knocked out, which would leave a hole so large as to necessitate the use of large washers, such as fender washers.

The invention has been described in terms of a specific embodiment, but it will be apparent to those skilled in the art that modifications may be made therein without departing from the true scope of the invention.

What is claimed is:

1. In an electric wiring system comprising a plurality of electrical members including at least one wire, at least one enclosure within which to make an electrical connection between the wire and a second one of the members, the enclosure having first and second walls substantially perpendicular to each other and at least one entrance on the second wall for the wire, at least one conduit surrounding the wire externally of the enclosure and extending away from the enclosure in a predetermined direction, one end of the conduit being mechanically attached to the enclosure adjacent the entrance, a conduit support bracket comprising:
  (a) a plate-like member having first and second ends longitudinally spaced apart in a first direction and aperture means spaced a predetermined distance from the first end;
  (b) means extending through the aperture means to attach the plate-like member to the first wall of the enclosure with the longitudinal direction between the ends of the member generally parallel to the predetermined direction in which the conduit extends away from the enclosure and the second end of the plate-like member extending beyond the second wall of the enclosure and generally parallel to the conduit; and
  (c) conduit-holding means attached to the plate-like member adjacent the second end thereof at any of a plurality of selected positions spaced transversely apart and substantially in alignment with the conduit to hold the conduit.

2. In an electric wiring system according to claim 1, a conduit support bracket comprising slot means extending transversely across the plate-like member adjacent the second end to receive the conduit-holding means.

3. In an electric wiring system according to claim 2, a conduit support bracket in which the plate-like member comprises engagement means extending along the slot means to engage predetermined parts of the conduit-holding means.

4. In an electric wiring system according to claim 3, a conduit support bracket in which the engagement means comprise ridges extending parallel to the slot means.

5. In an electric wiring system according to claim 4, a conduit support bracket in which the conduit-holding means comprises:
  (a) clamping means to clamp a conduit;
  (b) a bolt to pass through the clamping means and the slot means; and
  (c) a nut to engage the bolt and tighten thereon, the nut engaging the engagement means to prevent the nut from turning as the bolt is tightened therein.

6. In an electric wiring system according to claim 3, a conduit support bracket in which the engagement means comprise opposite edges of the slot means bent away from adjacent parts of the plate-like member to define flanges extending parallel to the slot means.

7. In an electric wiring system according to claim 6, a conduit support bracket in which the flanges extend from the plate-like member in a direction away from the conduit.

8. In an electric wiring system according to claim 7, a conduit support bracket in which the conduit-holding means comprises strut strap means engaging the flanges.

9. In an electric wiring system according to claim 2, a conduit support bracket comprising a strut having a central portion and sides extending from the central portion to define a generally U-shaped cross section with edge portions of the sides forming the slot means.

10. In an electric wiring system according to claim 9, a conduit support bracket in which the edge portions of each of the sides extend inwardly toward each other and are bent to extend generally parallel to each other within the generally U-shaped cross section toward the central portion to form flanges.

11. In an electric wiring system according to claim 1, a conduit support bracket in which the plate-like member comprises:
(a) a planar first portion adjacent the first end attached surface-to-surface with the first wall of the enclosure;
(b) an intermediate portion extending at an angle to the first portion; and
(c) a platform adjacent the second end and substantially parallel to the planar first portion.

12. In an electric wiring system according to claim 11, a conduit support bracket in which the conduit extends straight from the second wall across the platform and in contact therewith.

13. In an electric wiring system according to claim 1, a conduit support bracket in which opposite edges of the plate-like member adjacent the first end converge toward each other at an angle not greater than 90°, and the aperture means is adjacent the first end.

14. A conduit support bracket according to claim 1 in which the first wall of the enclosure has a center and a plurality of apertures spaced outwardly from the center in different directions, and the aperture means is a slot long enough to overlap the center and any of the apertures in the first wall.

15. A conduit support bracket to support elongated conduit means within a predetermined distance from an enclosure, said bracket comprising:
(a) a plate-like member having first and second ends longitudinally spaced apart in a first direction;
(b) receiving means extending transversely with respect to the first directions adjacent the second end of the plate-like member to hold conduit-holding means on the plate-like member at selected positions along the transversely extending receiving means to receive elongated conduit means extending in the first direction; and
(c) aperture means spaced from the second end in said first direction toward the first end to receive attachment means to hold the bracket firmly attached to the enclosure.

16. A conduit support bracket according to claim 15 in which opposite edges of the plate-like member adjacent the first end converge toward each other at an angle not greater than 90°, and the aperture means comprises a slot located adjacent the first end and extending longitudinally along the plate-like member.

17. A conduit support bracket according to claim 16 comprising a strut having a generally U-shaped cross section with a central portion and sides having inwardly turned edges defining the slot means with flanges extending within the cross section toward the central portion to receive and securely engage the strut strap means, the central portion of the strut being rigidly secured to the platform and extending transversely with respect to the longitudinal direction of the plate-like member.

18. A conduit support bracket according to claim 16 in which the receiving means comprises a second slot perpendicular to the first direction to hold the holding means at any selected location along the slot.

19. A conduit support bracket according to claim 18 comprising ridges extending parallel to the slot along each side thereof.

20. A conduit support bracket according to claim 18 comprising flanges along each side of the slot.

21. A conduit support bracket to support elongated conduit means within a predetermined distance from an enclosure, said bracket comprising:
(a) a plate-like member having first and second ends longitudinally spaced apart in a first direction and first and second longitudinal edges spaced transversely apart, the second end having a predetermined width to receive conduit-holding means on the plate-like member at selected positions within a predetermined transverse region to engage elongated conduit means extending in the first direction; and
(b) aperture means spaced from the second end in said first direction toward the first end to receive attachment means to hold the bracket firmly attached to the enclosure.

22. The conduit support bracket according to claim 21 in which the aperture means comprises a transverse slot extending part of the way across the plate-like member substantially midway between the first and second ends and to within less than about ¾" of each of the longitudinal edges.

23. The conduit support bracket according to claim 21 in which the aperture means comprises a slot midway between the longitudinal edges and extending longitudinally in the first direction.

24. The conduit support bracket of claim 21 in which the conduit-holding means is within a predetermined maximum distance from a predetermined location on the enclosure and is located on the plate-like member adjacent the second end at a selected position between the longitudinal edges to be in line with the elongated conduit means extending in the first direction from the predetermined location on the enclosure.

25. The conduit support bracket according to claim 21 in which the aperture means is substantially midway between the first and second ends.

26. The conduit support bracket according to claim 21 in which the aperture means is midway between the longitudinal edges.

* * * * *